United States Patent [19]
Azekawa

[11] Patent Number: 5,481,682
[45] Date of Patent: Jan. 2, 1996

[54] MICROCOMMAND FUNCTION SWITCHING CIRCUIT

[75] Inventor: Yoshifumi Azekawa, Hyogo, Japan

[73] Assignee: Mitsubishi Denki Kabushiki Kaisha, Tokyo, Japan

[21] Appl. No.: 865,020

[22] Filed: Apr. 8, 1992

[30] Foreign Application Priority Data

Apr. 8, 1991 [JP] Japan .................... 3-103149

[51] Int. Cl.⁶ ............................................ G06F 9/22
[52] U.S. Cl. ........................ 395/375; 364/DIG. 1; 364/DIG. 2; 364/245; 364/245.31; 364/262.4; 364/262.8
[58] Field of Search .................. 364/DIG. 1MS File, 364/DIG. 2MS File; 395/375, 700, 800

[56] References Cited

U.S. PATENT DOCUMENTS 4,093,982  6/1978  Heuer et al. .
4,104,720  8/1978  Gruner .
4,236,210  11/1980  Terakawa et al. .
4,503,500  3/1985  Magar .

FOREIGN PATENT DOCUMENTS 2199535  7/1990  Japan ................ G06F 9/22

Primary Examiner—Robert B. Harrell
Attorney, Agent, or Firm—Townsend and Townsend and Crew

[57] ABSTRACT

To facilitate the expansion and addition of instruction functions and to reduce development costs and time for products comprising new functions, the microaddress and mask address of a microinstruction are compared by a microaddress comparing circuit. When they correspond, an extended micropointer for generating an extended microaddress is selected by a pointer selecting circuit so as to access extended microinstruction memory in place of the micropointer and to exchange the function of a microinstruction specified by a microaddress with the function of an extended microinstruction.

12 Claims, 11 Drawing Sheets

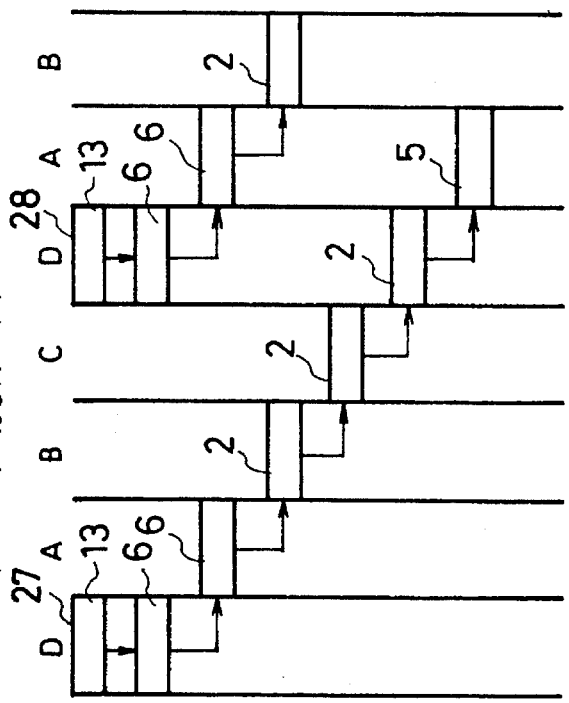
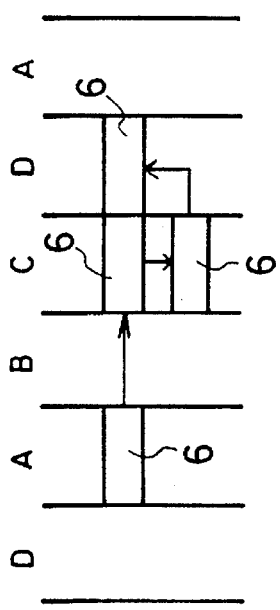
FIG.11 PRIOR ART
FIG.12 PRIOR ART
COMMAND DECODER 12
MICROADDRESS REGISTER 14
MICROADDRESS POINTER 7
MICROCOMMAND ROM 1
MICRODATA REGISTER 3
MICRODECODER 4
CONTROL SIGNAL 5
MICROADDRESS POINTER 7
MICROADDRESS COUNTER 8

MICROADDRESS POINTER 7
MICROCOMMAND ROM 1
MICRODATA REGISTER 3
NEXT MICROADDRESS REGISTER 10

MICROADDRESS POINTER 7
MICROADDRESS COUNTER 8
MICROADDRESS STACK REGISTER 11

MICROCOMMAND FUNCTION SWITCHING CIRCUIT

BACKGROUND OF THE INVENTION

1. Field of the Invention

This invention relates to a microprogram control circuit of a microprocessor, the operations of which are controlled by microcommands, and more particularly, to means for switching functions of microcommands.

2. Description of the Prior Art

FIG. 8 is a block diagram showing a prior art microprogram control circuit. Designated at 1 is microcommand storage means (hereinafter referred to as microcommand ROM), at 2 is microdata indicative of the contents of microcommands read out from the microcommand ROM 1, at 3 is a microdata register for holding microdata 2, at 4 is a decoder for decoding microdata and parameter information, at 5 is control signal obtained from the decoder 4, at 6 is microaddress data designating microcommand execution entries, at 7 is a microaddress pointer for accessing the microcommand ROM 1, at 8 is a counter for up-counting microaddress data from the micropointer 7, at 9 is next microaddress data indicative of the next microaddress with the content of address field of the microdata 2, at 10 is a next microaddress data register for storing the next microaddress data 9, at 11 is a microaddress stack register for storing return microaddress 6 when executing a sub-routine with a microcommand, at 12 is a command decoder for decoding externally fetched commands, at 13 is a decoder code obtained from the command decoder 12, at 14 is a microaddress register for holding microaddress code designating microcommand start entry address of the decoder code 13, at 15 is a microparameter register for storing parameter information such as addressing mode in the decoder code 13, and at 16 is a microparameter information.

FIG. 9 is a view showing a command format for explaining a method of microcommand start entry selection for every command in the prior art example. In the Figure, designated at 17 is a one-word command, at 18 is a two-word command, at 19 is an operation code prescribing a command operation, at 20 is a destination field designating the address of destination data and method of accessing the same address, at 21 is a size field designating the size of source data, at 22 is a source field designating the address of source data and method of accessing the same address, and at 23 is an extended field designated by the source field 22.

FIG. 10 is a view showing a horizontal microcommand entry configuration. In the Figure, designated at 24 is a microcommand, at 25 is a microaddress field designating the microaddress 6 of the next microcommand, and at 26 is a microsequence field designating the process sequence of a microprogram.

The operation of the prior art example will now be described with reference to FIGS. 8, 9 and 10. First, a method of production of the decoder code 13 will be described. A command which is fetched from an external storage unit (not shown) is supplied to the command decoder 12. The command decoder 12 generates a microaddress code corresponding to the start entry of microcommand 24 by specifying the kind of command according to the operation code 19. Simultaneously with the generation of the microaddress code, a parameter information code is generated from addressing mode for accessing destination and source data designated by the destination and source fields 20 and 22 and also from source data size information designated by the size field 21. The microaddress code and parameter information code are provided as the decoder code 13 from the command decoder 12. The microaddress code is stored in the microaddress register 14, while the parameter information code is stored in the microparameter register 15. When there are such additional information as off-set information and instantaneous value data for an addressing mode to access source data with two-word command 18 rather than one-word command 17, such information is provided as the extension field 23 designated by the source field 22. Data as to the size (which is one word in this case) of the extension field 23 and also as to whether there is the extension field 23, are provided as a source field parameter information code which also includes such data as the addressing mode and register No., i.e., as the decoder code 13. This means that the start entry of the microcommand 24 designated by the operation code 19 is not fixed in the format of the command. In other words, the start entry address of the microcommand 24 is determined by the sole operation code 19 and is independent of the contents of the source and destination fields 22 and 20, that is, if the operation code 19 indicates the same content of process, the microaddress 6 is the same with the one-word command 17 which does not have the extension field 23 and with the the two-word command 18 which has the extension field 23.

The microcommand 24 is read out in the following operation. A reading operation of the microcommand ROM 1 is started when the decoder code 13 is supplied to the microaddress register 14 and microparameter register 15. The microaddress 6 is read out from the microaddress register 14, and the microparameter information 16 is read out from the microparameter register 15. The microaddress 6 is held in the microaddress pointer 7, while the microparameter information 16 is held in the decoder 4. The. microaddress pointer 7 accesses the microcommand in the microcommand ROM 1 according to the microaddress 6 for reading the microcommand 24 as the microdata 2 into the microdata register 3.

Depending on the way of obtaining the microaddress 6, of the next microcommand 24 to be executed, designated by the microsequence field 26 thereof, different operations are executed as follows.

First, in case of a microcommand without any branch, the microdata 2 is provided from the microdata register 3 to the decoder 4. The decoder 4 decodes the previously held microparameter information 16 and microdata 2 and generates control signal 5 for controlling an arithmetic unit or the like. As soon as the microdata 2 is provided from the microdata register 3 to the microdecoder 4, the next decoder code 13 is set in the microaddress register 14 and microparameter register 15. When the microsequence field 26 of the microcommand 24 indicates the end thereof, the microaddress 6 for the execution of the next microcommand is provided from the microaddress register 14 to the microaddress pointer 7, while the microparameter information 16 is provided from the microparamter register 15 to the decoder 4, thus reading out new microcommand 24 from the ROM 1.

When a command decoded in the command decoder 12 is executed with a plurality of microcommands 24, the counter 8 up-counts the microaddress 6 of the microaddress pointer 7 concurrently with the reading of microcommand 24 from the microcommand ROM 1 until the microsequence field 26 indicates the end of the microcommand 24. The up-counted microaddress 6 is used to read out the next microcommand 24.

When the microsequence field 26 of the microcommand 24 indicates the branching thereof, i.e., when a command decoded by the command decoder 12 is executed with a plurality of microcommands 24, the microdata register 3 provides the microaddress field 25 of the microdata 2 as the next microaddress data to the next microaddress data register 10. Meanwhile, the microdata 2 that is provided by the microaddress field 25 is supplied from the microdata register 3 to the decoder 4. The decoder 4 produces control signal 5 in the manner as described above. During this time, the microaddress pointer 7 reads the microaddress 6 into the next microaddress data register 10 for the reading of the next microcommand 24 until the microsequence field 26 indicates non-branching or end of the microcommand 24.

Finally, when the microsequence field 26 of the microcommand 24 indicates sub-routine branching of microcommand 24, i.e., when the microcommand 24 is for execution of microsub-routines, more specifically, when a command decoded by the command decoder 12 is executed with microcommand 24 which is common to other commands, the microdata register 3 provides the microaddress field 25 of microdata 2 as next microaddress data for a jumped sub-routine destination to the next microaddress data register 10. Meanwhile, the microdata 2 provided by the microaddress field 25 is supplied from the microdata register 3 to the decoder 4. The decoder 4 produces control signal in the manner as described above. Concurrently, the microaddress counter 8 up-counts the microaddress 6 of the microaddress pointer 7 for storage as a microsub-routine return address in the microaddress stack register 11. The microaddress 6 of microsub-routine branch destination is read from the next microaddress data register 10 into the microaddress pointer 7 to execute a branched sub-routine. When the microsequence field 26 indicates the end of the branched microsub-routine, the microaddress pointer 7 reads the microaddress 6 of the microaddress stack register 11 as the sub-routine return destination address for the reading of the next microcommand 24.

Timings in the above operation will be briefly described with reference to FIGS. 11 to 14. Referring to FIG. 11, designated at 27 is a flow of execution of command I, at 28 is a flow of execution of command II, and at A to D are operation cycles for microcommand reading. The arrows indicate the direction of data shift. The reference numerals and symbols like those in FIG. 8 indicate the same functions.

Basically, the four cycles A to D constitute a microcommand read cycle.

First, a case when the execution of a command provided from the command decoder 12 is ended by a single microcommand will be described with reference to FIG. 11. In cycle D immediately preceding the reading of data from the ROM 1, the data code 13 of the command I is provided from the command decoder 12, and the microaddress 6 is provided to the microaddress register 14. In cycle A, the microaddress 6 is read into the microaddress pointer 7, in cycle B the ROM 1 is accessed, in cycle C the microdata 2 is read into the microdata register 3, in cycle D it is decoded together with the microparameter information 16 in the decoder 4, and in the next cycle A the control signal 5 is provided.

In the cycle D, the decoder code 13 of the command II is provided from the command decoder II to be processed in the manner as with the command I.

Now, the way of obtaining the next microaddress in case of executing a plurality of microcommands will be described. FIG. 12 shows a case of a microcommand which does not branch. In cycle C microaddresses 6 of the microaddress pointer 7 are fetched and up-counted by the counter 8 to be delivered to the microaddress pointer 7 in cycle D. In the next cycle B, the next microcommand is accessed by the micropointer 7.

FIG. 13 shows a case of a microcommand which branches. In this case, in cycle C the next microcommand address 9 indicated by the address field 25 of a microcommand provided by the microdata register 4 is stored in the next microaddress register 10. In the next cycle A it is delivered to the micropointer 7, and in the next cycle B the destination microcommand is accessed by the micropointer 7.

FIG. 14 shows a case of sub-routine branching. In this case, in cycle C the microaddresses 6 of the microaddress pointer 7 are fetched and up-counted by the counter 8, and in cycle D it is delivered to the microaddress stack register 11. In the next cycle A it is delivered to the microaddress pointer 7, and in the next cycle B the destination microcommand is accessed.

In the above prior art example, alterations of a microcommand execution procedure are possible by altering the programming of the microaddress field and microsequence field in the microcommand. This can be readily implemented by altering, in the process of manufacture, data for programming with the microcommand ROM.

However, when it is desired to add new commands or expand or alter the functions of commands, it is necessary to effect programming with an expansion microcommand ROM or the like which is additionally provided on the chip. This dictates a drastic circuitry change such as to permit decoding of the microaddresses of the new expansion microcommand ROM as command by the command decoder. This means an extension of the development time and poses problems in the development of new products with alteration of microcommands. The claimed invention solves this problem by providing circuitry which allows easy expansion and/or alteration of the functions of commands by switching those functions with extended functions.

SUMMARY OF THE INVENTION

The present invention seeks to solve the above problem inherent in the prior art, and it has an object of providing a microprogram control circuit, which permits ready expansion and addition of command functions, thus reducing the cost and time of development of a product incorporating new functions.

To attain the above object of the invention, there is provided, as claimed in claim 1, a microprogram control circuit for a microprocessor operable under control of microcommands, which comprises microcommand memory 1 for storing microcommands, a microaddress pointer 7 for accessing the microcommands with microaddress designating execution entries of the microcommands, extension microcommand memory 33 for storing extension Microcommands obtaining by extending and having different contents from the microcommands, an extension microaddress pointer 35 for accessing the extension microcommands with the microaddresses, a mask address register 29 for storing mask addresses for masking the microcommands, a microaddress comparator circuit 31 for comparing the microaddresses and a mask addresses, and a microaddress pointer selection circuit 37 for selecting either the microaddress pointer or the extension microaddress pointer according to a selection signal from microaddress comparator circuit 31, functions of the microcommands designated by the microaddresses set in the mask addresses being capable of being switched over to functions of the extension microcommands.

According to the invention there is also provided, as claimed in claim 2, a microprogram control circuit for a microprocessor operable under control of microcommands, which comprises, in addition to the microprogram control circuit as claimed in claim 1, an off-set address register 40 for storing off-set addresses in extension microcommand memory 33, a microaddress operational unit 41 for executing an operation on the off-set addresses and microaddresses to derive extension microaddresses, and an extension microaddress pointer 35 for accessing extension microcommands with the extension microaddresses calculated in the microaddress operational unit 41, the off-set addresses being calculated as microaddresses set in the mask addresses to switch functions of microcommands designated by the microaddresse's over to functions of extension microcommands.

According to the invention there is further provided, as claimed in claim 3, a microprogram control circuit for a microprocessor operable under control of microcommands, which comprises microcommand memory 31 for storing microcommands, a microaddress pointer 17 for accessing the microcommands with microaddresses, extension microcommand memory 33 for extending the microcommands and storing extension microcommands having different contents from those of the microcommands, an extension microaddress pointer 35 for accessing the extension microcommands with the microaddresses, a mask address register 29 for storing mask addresses for masking the microcommands, a microaddress comparator circuit 31 for comparing the mask addresses and the microaddresses, and a microoutput selection circuit 42 for selecting either the output of the microcommand memory 1 or the output of the extension microcommand memory 33 according to a comparison signal from the microaddress comparator circuit, functions of microcommands designated by microaddresses set in the mask addresses being capable of being switched over to functions of the extension microcommands.

According to the invention, there is still further provided, as claimed in claim 4, a microprogram control circuit for a microprocessor operable under control of microcommands, which comprises, in addition to the microprogram control circuit as claimed in claim 3, an off-set address register 40 for storing off-set addresses to extension microcommand memory 33, a microaddress operational unit 41 for performing an operation on the off-set addresses and microaddresses to derive extension microaddresses, and an extension microaddress pointer 35 for accessing the extension microaddresses, off-set addresses being calculated as microaddresses set in mask addresses to switch functions of microcommands designated by the microaddresses over to functions of extension microcommands.

With the microprogram control circuit as claimed in claim 1, when a microaddress for accessing a microcommand with a function of a command desired to be masked is supplied to the microaddress pointer 7, it is detected by the microaddress comparator circuit 31, and the microaddress pointer selection circuit 37 which receives the detection signal, starts the extension microaddress pointer 35 at the given microaddress to switch the function of the command desired to be masked with the function of the extension microcommand.

With the microprogram control circuit as claimed in claim 2, when a microaddress for accessing a microcommand with a function of a command desired to be masked is supplied to the microaddress pointer 7, the microaddress operational unit 41 calculates an extension microaddress from the microaddress and off-set address while at the same time the microaddress comparator 31 detects the mask address, and the microaddress pointer selection circuit 37 which receives the detection signal, starts the extension microaddress pointer 35 at the given microaddress to switch the function of the command desired to be masked over to the function of the extension microcommand.

With the microprogram control circuit as claimed in claim 3, when a microaddress for accessing a microcommand with a function of a command desired to be masked is supplied to the microaddress pointer 7, it is detected by microaddress comparator circuit 31, and the microoutput selection circuit 42 which receives the detection signal, selects the output of the extension microcommand memory 33 to switch the function of the command desired to be masked over to the function of the extension command.

With the microprogram control circuit as claimed in claim 4, when a microaddress for accessing a microcommand with a function of a command desired to be masked is supplied to the microaddress pointer 7, the microaddress operational unit 41 calculates an extension microaddress from the microaddress and off-set address, while at the same time the microaddress comparator circuit 31 detects the mask address, and the microoutput selection circuit 42 which receives the detection signal, selects the output of the extension microcommand memory 33 to switch the function of the command desired to be masked over to the function of the extension microcommand.

The above and other objects, features and advantages of the invention will become more apparent from the following description when taken in conjunction with the accompanying drawings.

BRIEF DESCRIPTION OF THE DRAWINGS

FIG. 11 is a view showing operation timings in the prior art example;

FIG. 12 is a view showing microaddress derivation timings in the prior art example shown in FIG. 8;

DESCRIPTION OF THE PREFERRED EMBODIMENT

EMBODIMENT 1

Figure 1:
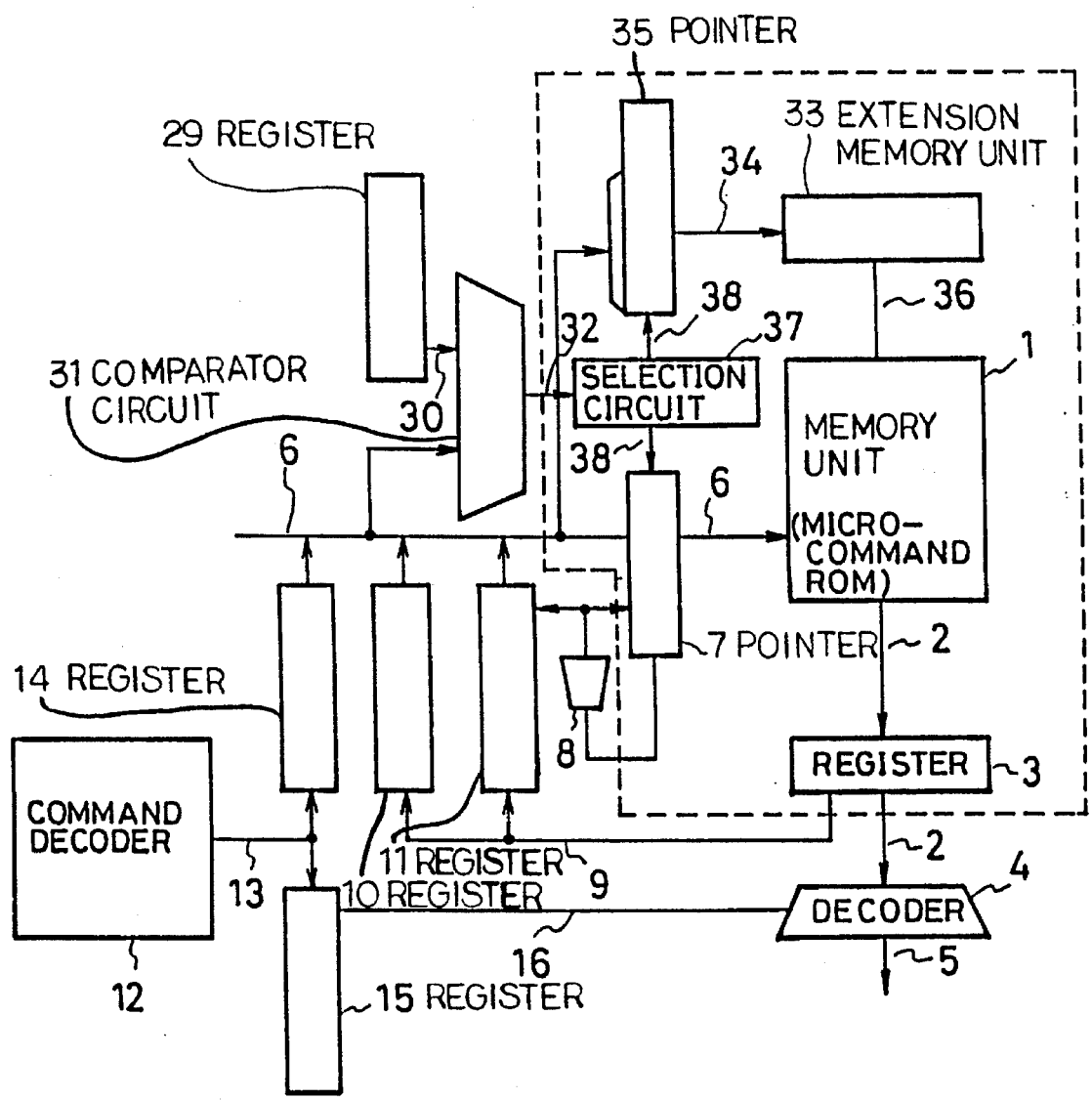
FIG. 1 is a block diagram showing Embodiment 1 of the microprogram control circuit according to the invention.
Figure 8:
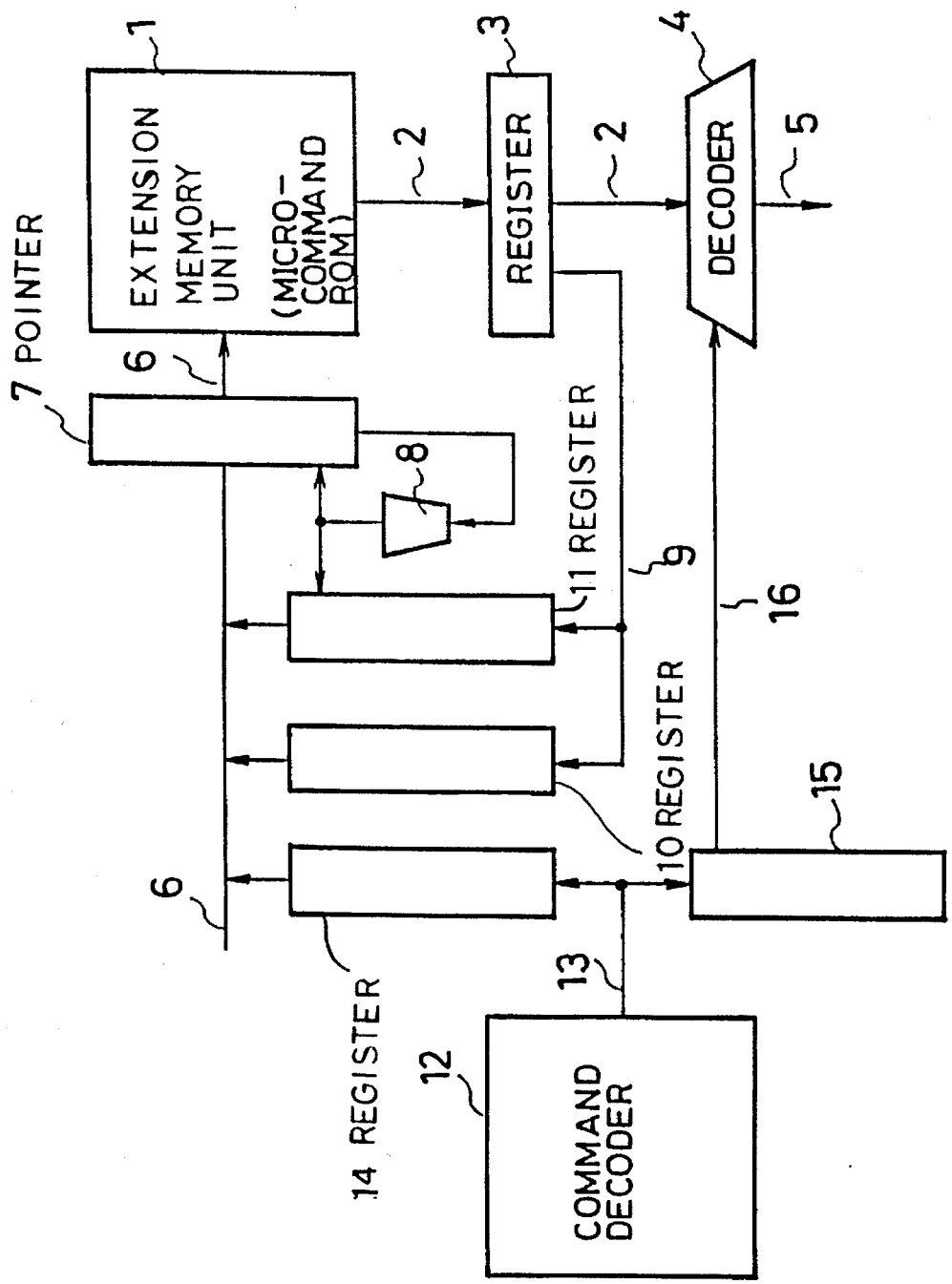
FIG. 8 is a block diagram showing a portion of a prior art microprogram control circuit.
Figure 9:
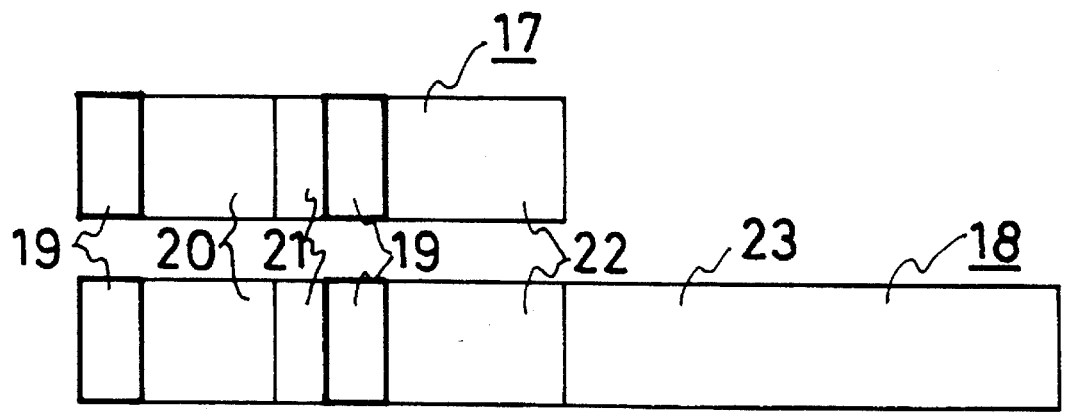
FIG. 9 is a view showing an example of command format.

FIG. 1 shows Embodiment 1 of the invention. Referring to the Figure, designated at 29 is a mask address register for storing addresses of microcommands, which have functions subject to alteration, at 30 is mask address data, at 31 is a microaddress comparator for comparing the mask address 30 to the microaddress 6 or next microaddress 9, at 32 is the result of comparison by the microaddress comparator 31, at 33 is an expansion microcommand ROM for storing expansion microcommands, at 34 is expansion microaddress data designating execution entries of the expansion microcommand ROM 33, at 35 is a an expansion microaddress pointer for generating expansion microaddress data 34 from the microaddress data 6, at 36 is an expansion microdata read out from the expansion microcommand ROM 33, at 37 is a microaddress pointer selection circuit for selecting either microaddress pointer 7 or expansion microaddress pointer 35 according to the result 32 of comparison in the microaddress comparator 31, and at 38 is a selection signal from the microaddress pointer selection circuit 37. In the Figure, parts equivalent to those in FIG. 8 are designated by like reference numerals and symbols.

In the microprogram control circuit shown in FIG. 1, as in the prior art example, the read operation of the microcommand ROM 1 is started when the decoder code 13 is supplied to the microaddress register 14 and microparameter register 15. First, the microaddress data 6 is read out from the microaddress regisher 14, and the microparameter information 16 is read out from the microparameter register 15. The read-out microparameter information 16 is held in the decoder 4, while the microaddress data 6 is read into the microaddress pointer 7 and is also fetched by the microaddress comparator 31. The microaddress comparator 31 compares the fetched microaddress 6 to mask address 30, which is an entry address of a microcommand which is set in the mask address register 29 and is the microaddress of the function to be switched.

If the two compared addresses are not identical, the result 32 of comparison indicates out-of-identity. Receiving this result, the microaddress pointer selection circuit 37 selects the microaddress pointer 7, in accordance with the selection signal 38. As in the prior art example, the microaddress pointer 7 reads out a microcommand from the microcommand ROM 1.

If the compared addresses are identical, the result 32 indicates identity. Receiving this result, the microaddress pointer selection circuit 37 selects the extension microaddress pointer 35, in accordance with the selection signal 38. The extension microaddress pointer 35 reads out the extension microaddress command from the extension microaddress ROM 33. Since in this embodiment a microdata signal line (not shown) in the microaddress ROM 1 is used directly to this end, the extension microdata 36 read out from the extension microcommand ROM 33 is passed through the microcommand ROM 1 as microdata 2. The microdata register 3 processes the microdata 2 and extension microdata 36 without any discrimination between the two.

Like the prior art example, different operations are executed depending on the way the next microaddress 6 designated by the microsequence field 26 of the microcommand 24 is obtained. However, these operations are the same as those in the prior art example except for the fact that the data decoded together with the microparameter information 16 can be either microdata 2 or extension microdata 36.

The microaddress comparator 31 compares the mask address 30 to the microaddress 6 for processing according to the result 32 of the comparison, as in the prior art example in the case of microcommand 24 which branches such that the next microaddress 9 of the next microaddress register 10 is selected as the next microaddress 6, and also in the case of microcommand 24 involving micro-sub-routines wherein the microaddress 6 of the microaddress stack register 11 is selected as the microaddress 6.

Further, once an extension microcommand is selected, the extension microaddress pointer 35 continues to always access extension microcommand until detection of the end of the extension microcommand with the sequence field 26 (i.e., until the end of the extension microcommand).

Figure 2:
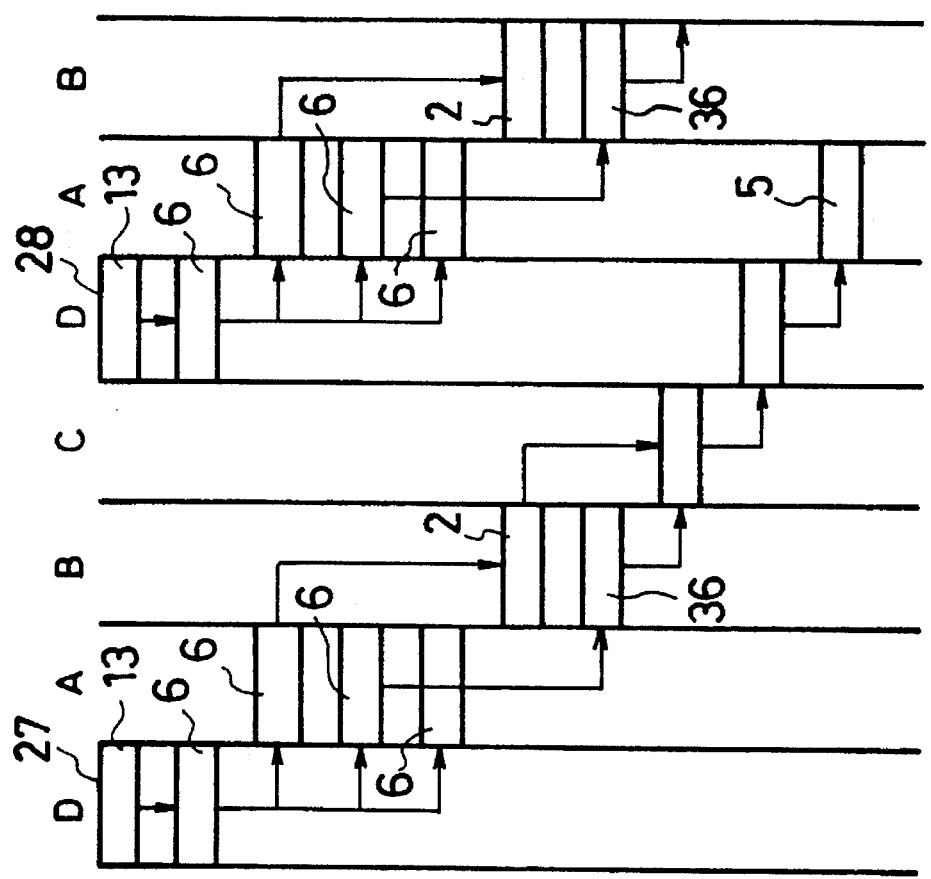
FIG. 2 is view showing operation timings of the embodiment shown in FIG. 1.

FIG. 2 shows timings of the above operation. The basic timings are the same as those in the prior art example, and only different timings from those in the prior art will be described. In cycle A the microaddress data 6 is supplied to the extension microaddress pointer 35 and microaddress comparator 31, and in cycle B the microaddresses 30 and 6 are compared to produce the result 32 of comparison. According to the result 32 of comparison the microaddress pointer selection circuit 37 selects either microaddress pointer 7 or extension microaddress pointer 35 to read out the content of the microcommand ROM 1 or extension microcommand ROM 33.

Figure 3:
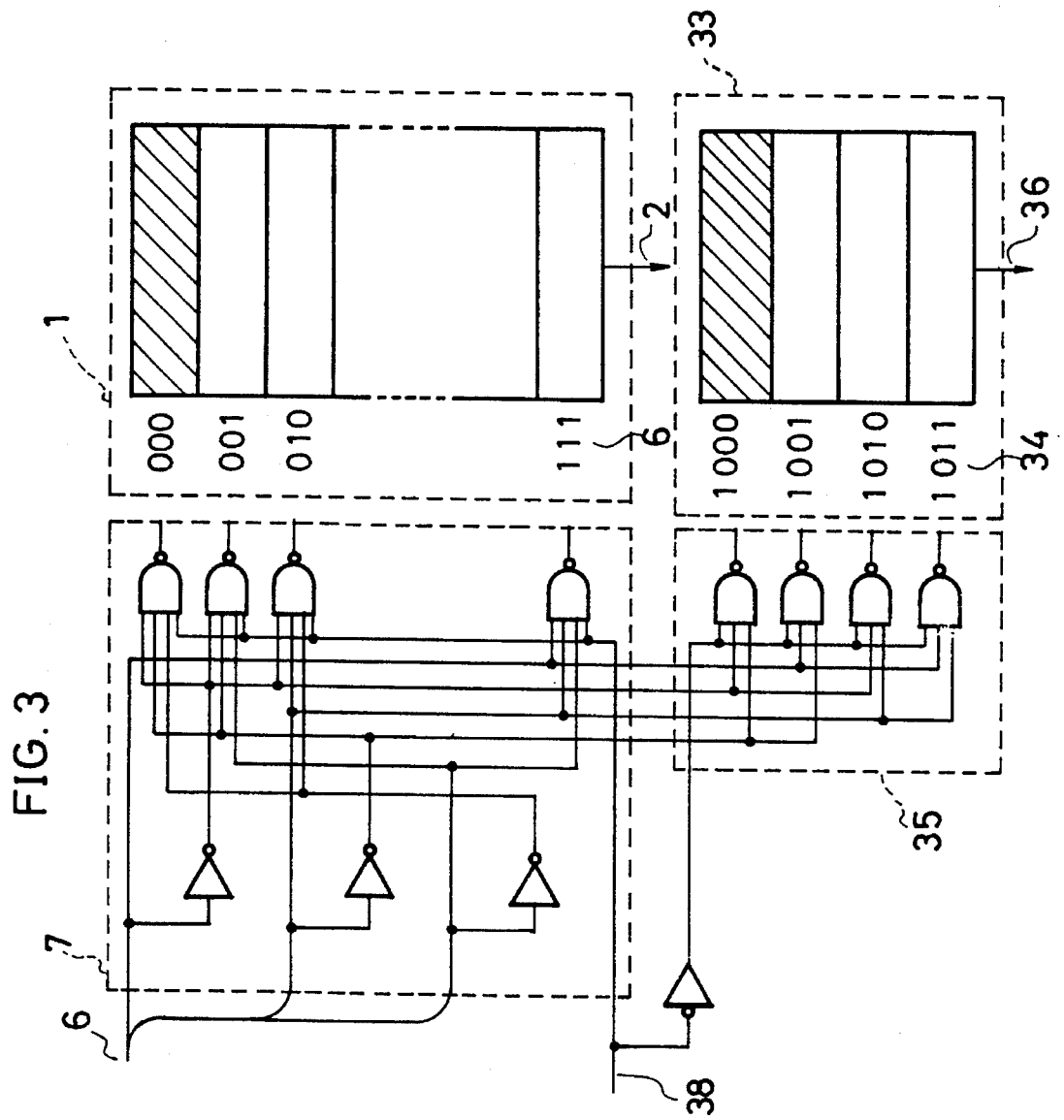
FIG. 3 is a view for explaining a microcommand switching operation in the embodiment shown in FIG. 1.

FIG. 3 is a view for explaining a microcommand interchange operation. In this circuit, there are eight microaddresses "000" to "111" for microcommands in the microcommand ROM 1 and four microaddresses "1000" to "1011" for extension microcommands in the extension microaddress ROM 33. The microaddress pointer 7 receives the 3-bit microaddress 6, and if the selection signal 38 is at a high level, it decodes eight entry microaddresses corresponding to microcommands in the microcommand ROM 1. Likewise, the extension microaddress pointer 35 receives lower 2 bits of microaddress 6, and if the selection signal 38 is at a low level, it decodes four entry microaddresses corresponding to microcommands in the extension microaddress ROM 33. The lower two bits of microaddress 6 are used to designate the extension microcommand selection for the microcommand has locality as in the case of the ordinary memory access. The step number of the microcommand is far smaller than the memory access data, and the extension portion need not be so large. Although not described in this example, if the compared addresses have the same lower bits such as "1000" and "1100", the extension side is accessed by adding another bit, i.e., using three bits.

A microcommand interchange operation will now be described. Assuming that the microaddress is "000", the microaddress pointer 7 accesses a microcommand (referred to herein as microcommand 201" which is stored in address "000" of the microcommand ROM 1. Likewise, the extension microaddress pointer 35 receiving the lower bits of microaddress 6 accesses a microcommand (referred to herein as microcommand 202) stored in address "1000" of the extension microaddress ROM 33. If the selection signal 38 from the microaddress pointer selection circuit 37 is at a high level, the microaddress pointer is selected to read out the microcommand 201. If the selection signal 38 is at a low level, the extension microcommand pointer 35 is selected to read out the microcommand 202.

EMBODIMENT 2

Figure 4:
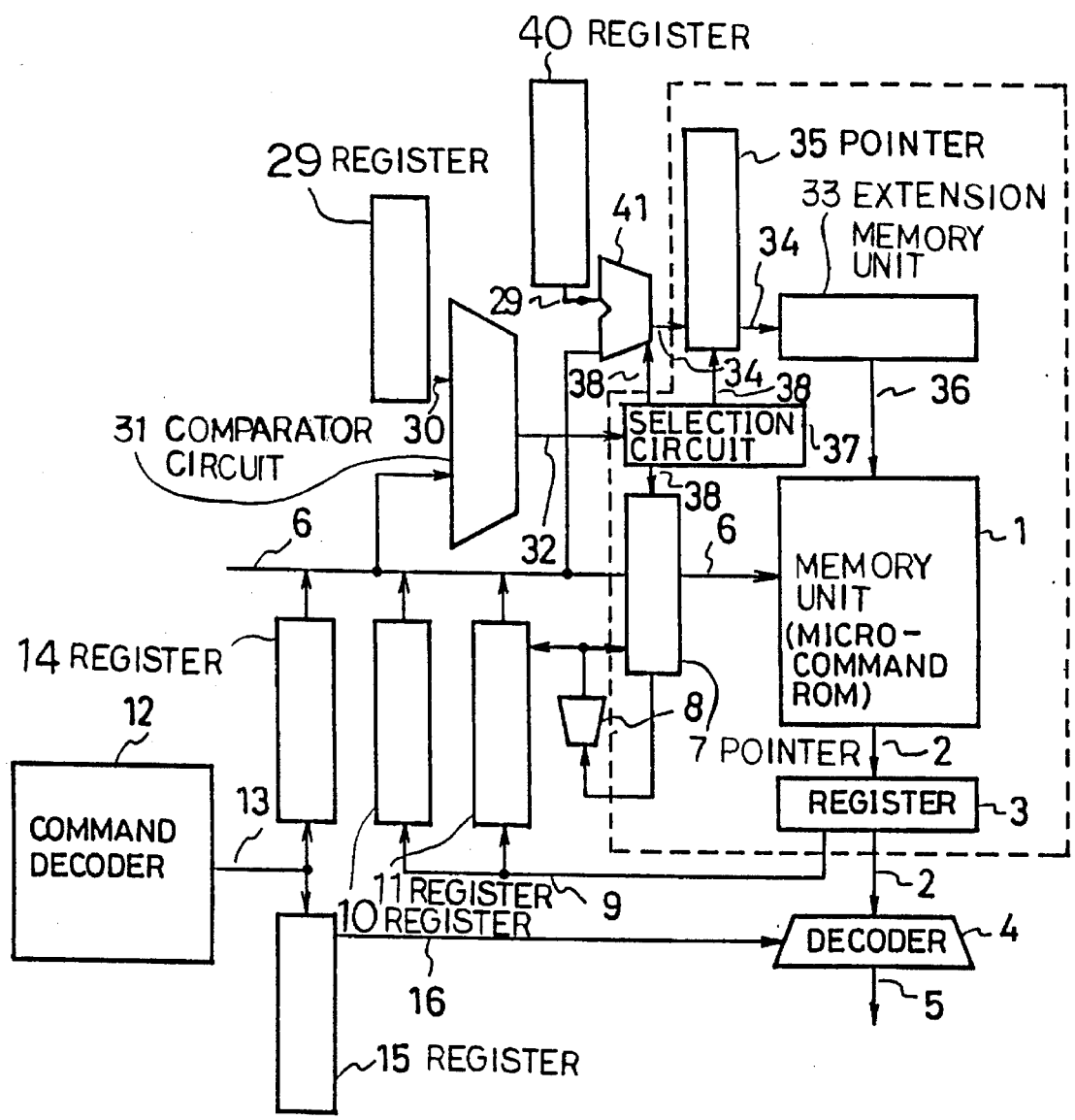
FIG. 4 is a block diagram showing i.e., Embodiment 2 of the microprogram control circuit according to the invention.

FIG. 4 shows a second embodiment of the invention. Referring to the FIG., designated at 39 is an off-set address data for accessing the extension microaddress ROM 33, at 40 is an off-set address resister for storing off-set address data, and at 41 is a microaddress operational unit for performing operation on the off-set address and microaddress data 39 and 6.

In the microprogram control circuit shown in FIG. 4, the read operation of the microcommand ROM 1 is started when the decoder code 13 is supplied to the microaddress register 14 and microparameter register 15. First, the microaddress data 6 is read out from the microaddress register 14, and microparameter information 16 is read out from the microparameter register 15. The read-out microparameter information 16 is held in the decoder 4, and the microaddress data 6 is read into the microaddress pointer 7 and fetched by the microaddress comparator 31 and microaddress operational unit 41. The microaddress operational unit 41 performs operation on the off-set address and microaddress data 39 and 6 to provide the extension microaddress to the extension microaddress pointer 35. The microaddress comparator 31 compares the microaddress 6 to mask address 30, which is the entry address of a microcommand set in the mask address register 29 and having a function desired to be switched. If the compared addresses fail to be identical, the result 32 of comparison indicates out-of-identity. Receiving this result, the microaddress pointer selection circuit 37 selects the microaddress pointer 7 according to the selection signal 38. The microaddress pointer 7 reads out microcommand from the microcommand ROM 1 as in the prior art example.

If the compared addresses are identical, the result 32 of comparison indicates identity. Receiving this result, the microaddress pointer selection circuit 37 selects the extension microaddress pointer 35 according to the selection signal 38, and the extension microaddress pointer 35 reads out extension microcommand from the extension microcommand ROM 33. Since a microdata line in the microcommand ROM 1 is used to this end like the previous embodiment shown in FIG. 1, the extension microdata 36 of extension microcommand read out from the extension microcommand ROM 33 is passed through the microcommand ROM 1 as microdata 2. The microdata register 3 processes the microdata 2 and extension microdata 36 without any discrimination between the two.

As in the prior art example, different operations are performed depending on the way the next microaddress 6 designated with the microsequence field 26 of the microcommand 24 is obtained. However, these operations are the same as in the prior art example except for the fact that the data decoded together with the microparameter information 16 can be either microdata 2 or extension microdata 36.

Further, the input of the microaddress 6 to the microaddress comparator 31 is compared to the mask address 30 for processing according to the result 32 of comparison, as in the prior art in the case of a microcommand which branches such that the next microaddress 9 of the next microaddress register 10 is selected as the next microaddress, and also in the case of a microcommand involving microsub-routines so that the microaddress 6 of the microaddress register 11 is selected as the next microaddress 6.

Like the input to the microaddress comparator 31, the input to the microaddress operational unit 41 is the next microaddress 9 from the next microaddress register 10, in the case of microcommand branching, and the microaddress 6 of the microaddress stack register 11, in the case of a microsub-routine.

Further, once an extension microcommand is selected, the extension microaddress pointer 31 remains selected until the detection of the end of the extension microcommand 24 with the sequence field 26 (i.e., until the end of the extension microcommand).

Figure 5:
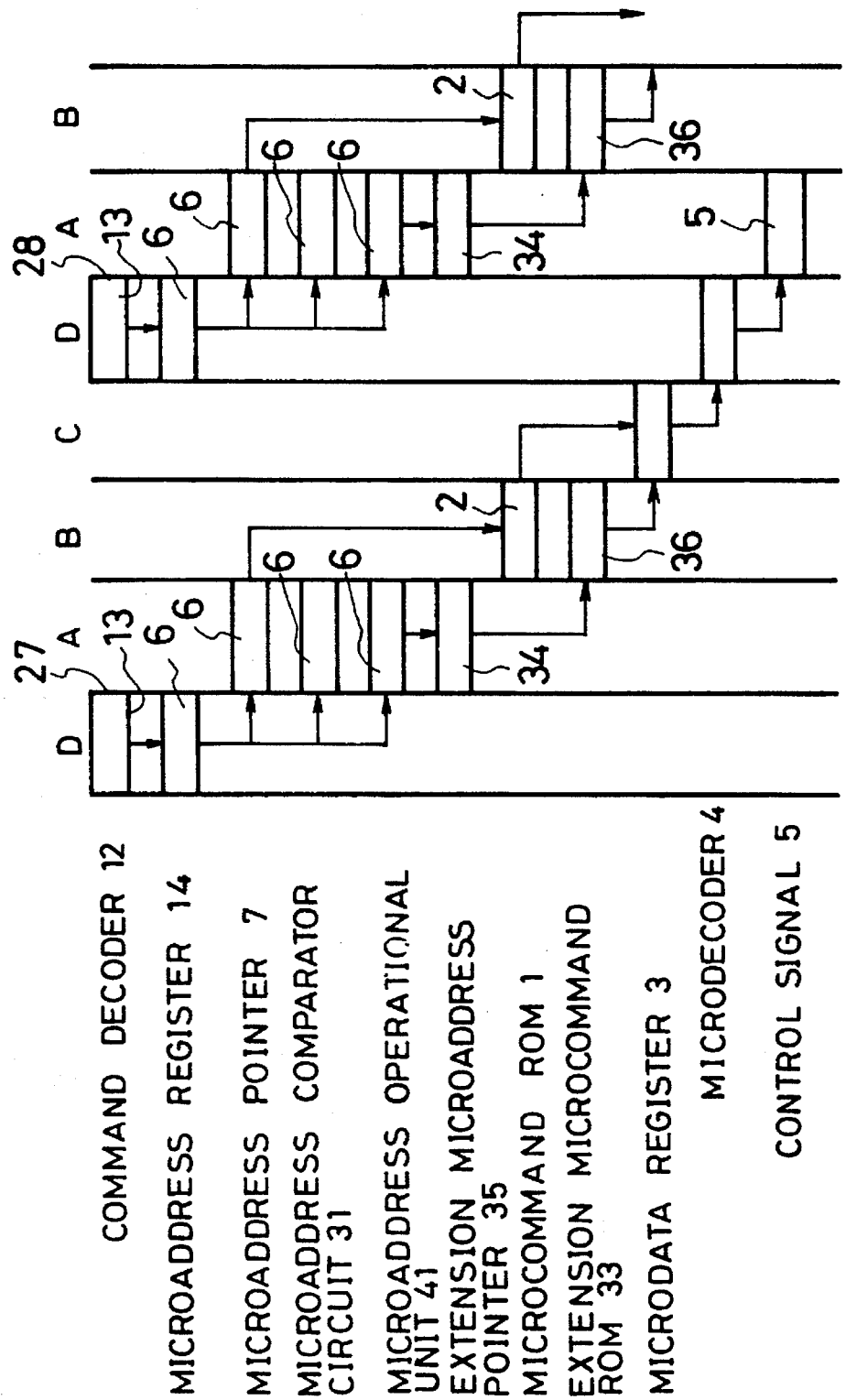
FIG. 5 is a view showing operation timings of the embodiment shown in FIG. 4.

FIG. 5 shows timings in the above operation. Basic timings are the same as shown before in connection with the prior art example, and only the differences from the prior art example will be described. In cycle A the microaddress 6 is supplied to the microaddress comparator 31 and microaddress operational unit 41. The microaddress operational unit 41 performs operation on the microaddress 6 and off-set address 39 and supplies the extension microaddress 34 to the extension microaddress pointer 35, and in cycle B the mask address 30 and microaddress 6 are compared. According to the result 32 of comparison, the microaddress pointer selection circuit 37 selects the microaddress pointer 7 or extension microaddress pointer 35 for reading the content of the microaddress ROM 1 or extension microaddress ROM 33.

EMBODIMENT 3

Figure 6:
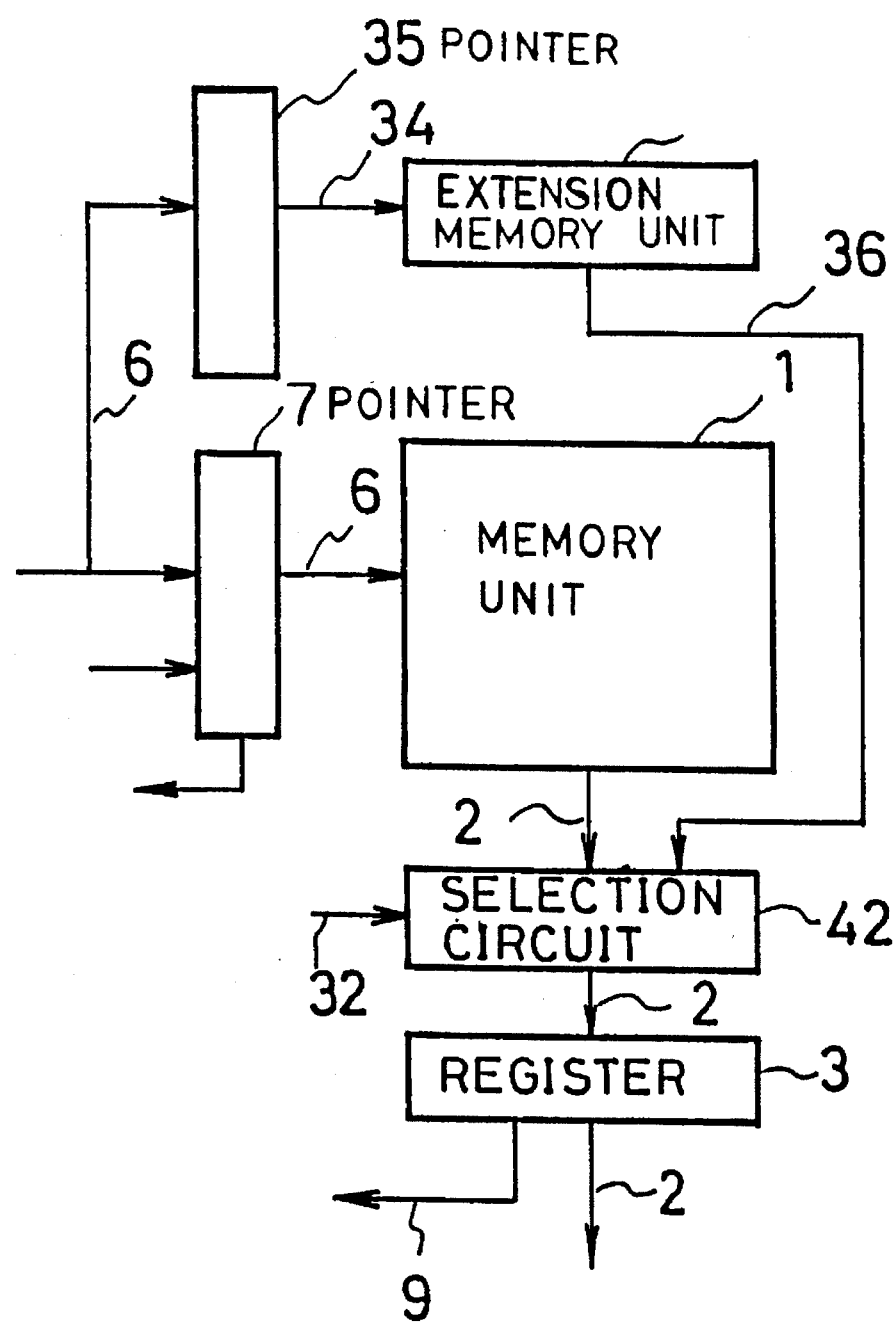
FIG. 6 is a block diagram showing Embodiment 3 of the microprogram control circuit according to the invention.

FIG. 6 shows Embodiment 3 of the invention. This embodiment is the same as the embodiment shown in FIG. 1 other than the portion shown enclosed in the dashed frame in FIG. 1, modified per FIG. 6. Parts equivalent like those in FIG. 1 are designated by like reference numerals and symbols. Referring to FIG. 6, designated at 42 is a microoutput selection circuit.

In the microprogram control circuit shown in FIG. 6, the operation is basically the same as in Embodiment 1, and is therefore not described. It is different in that both the microaddress ROM 1 and extension microaddress ROM 33 are always both accessed, and if the result of comparison to the mask address 30 in the microaddress comparator 31 indicates out-of-identity, the microoutput selection circuit 42 receiving the result 32 of comparison selects the microdata 2 read out from the microaddress ROM 1 and provides it to the microdata register 3. If the result 32 of comparison indicates identity, the microoutput selection circuit 42 receiving the result 32 selects the extension microdata 36 read out from the extension microcommand ROM 33 and provides it to the microdata register 3.

Figure 10:
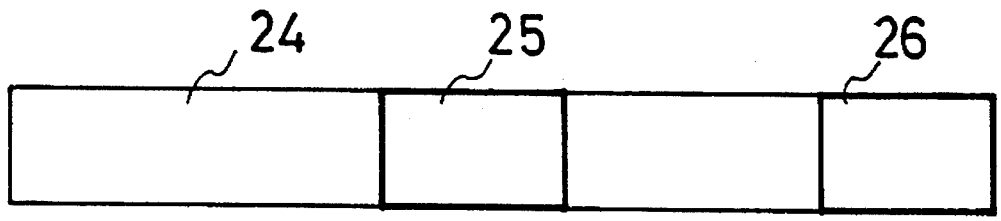
FIG. 10 is a view showing an example horizontal microcommand entry configuration.
Figure 13:
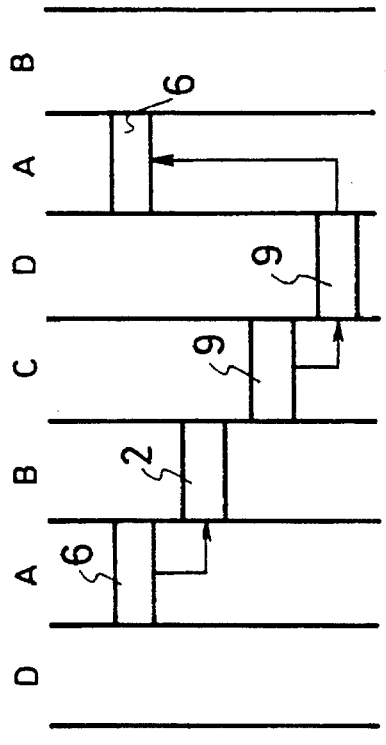
FIG. 13 is a view showing operation timings for obtaining a destination microaddress in the prior art example shown in FIG. 8.
Figure 14:
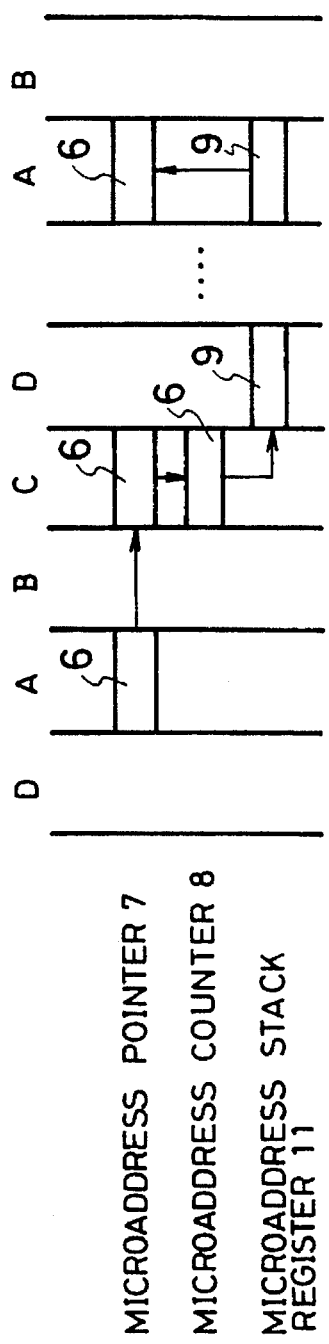
FIG. 14 is a view showing operation timings for obtaining a microsub-routine return destination microaddress in the prior art example shown in FIG. 8.

Like the Embodiment 1, different operations are executed depending, on the way the next microaddress 6 designated by the microsequence field of the microcommand 24 is obtained (FIG. 10). The operations are the same as in Embodiment 1, except for the fact that the data provided from the microoutput selection circuit 42 to the microdata register 3 can be either microdata 2 or extension microdata 36.

Further, the microaddress 6 input to the microaddress comparator 31 is compared in the same way to the mask address 30 for processing according to the result 32 of the comparison, as in the prior art example in the case of microcommand 24 which branches such that the next microaddress 9 of the next microaddress register 10 is selected as the next microaddress 6, and also in the case of microcommand 24 involving micro-subroutines, such that the microaddress 6 of the microaddress stack register 11 is selected as the next microaddress 6.

Further, once an extension microcommand is selected, the microoutput selection circuit 42 continues to select extension microdata 36 until detection of the end of the extension microcommand with the sequence field 26 (i.e., until the end of the extension microcommand).

EMBODIMENT 4

Figure 7:
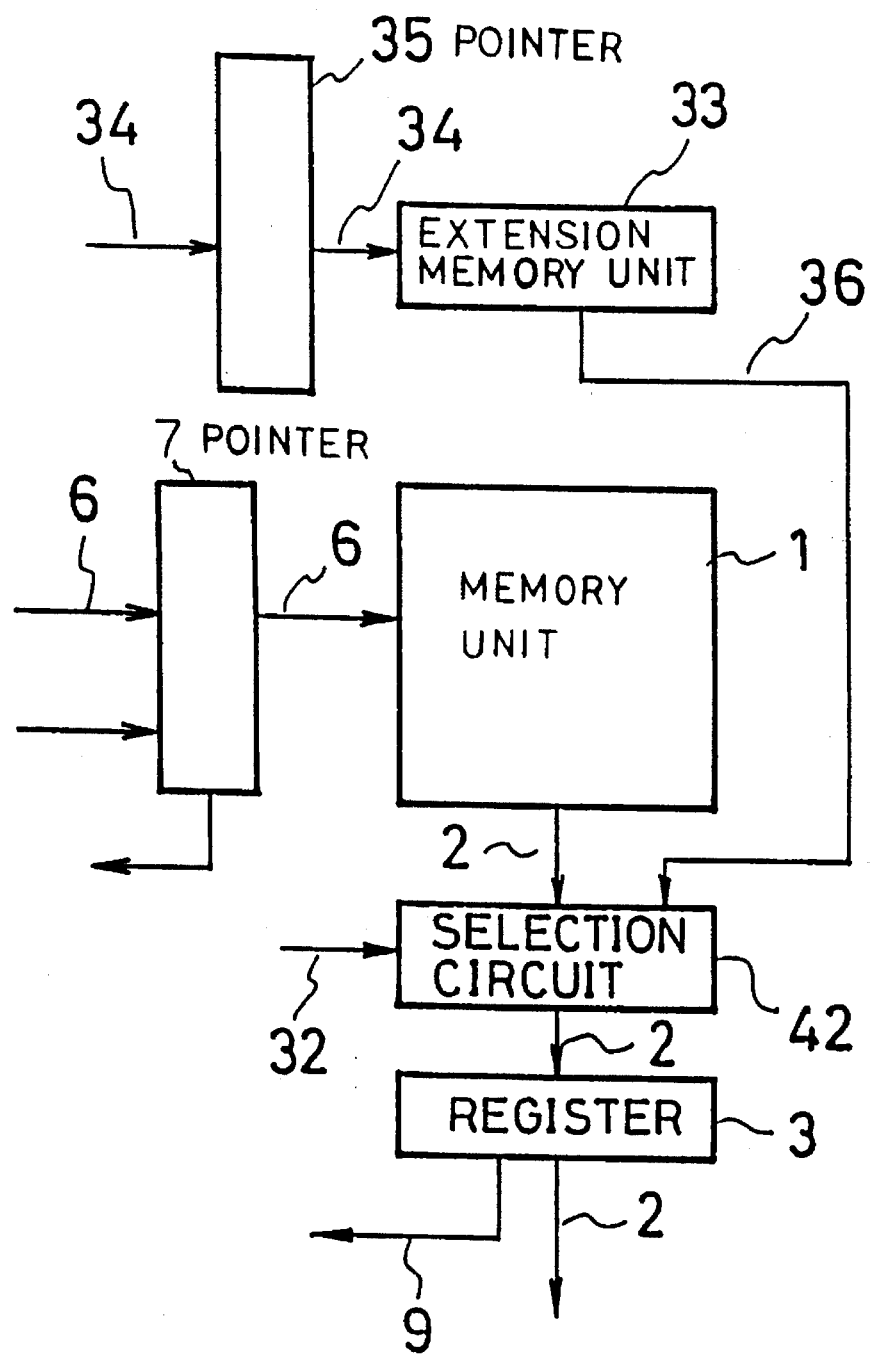
FIG. 7 is a block diagram showing Embodiment 4 of the microprogram control circuit according to the invention.

FIG. 7 shows Embodiment 4. This embodiment is the same as the embodiment shown in FIG. 4 except for the portion shown enclosed in the dashed frame in FIG. 4, modified per FIG. 7. In addition, parts equivalent to those in FIG. 4 are designated by like reference numerals and symbols.

In the microprogram control circuit shown in FIG. 7, the operation is basically the same as in Embodiment 2. It is different in that if the result 32 of comparison to the mask address 3 in the microaddress comparator 31 indicates out-of-identity, the microoutput selection circuit 42 receiving the result 32 of comparison selects the microdata 2 read out from the microcommand ROM 1 and provides it to the microdata register 3. If the result 32 of comparison indicates identity, the microoutput selection circuit 42 receiving the result 32 selects the extension microdata 36 read out from the extension microcommand ROM 33 and provides it to the microdata register Like the Embodiment 2, different operations are executed depending on the way of obtaining the next microaddress designated with the microsequence field of the microcommand 24 is obtained. However, these operations are the same as in Embodiment 2, except for the fact that the data provided from the microoutput selection circuit 42 to the microdata register 3 can be is either microdata 2 or extension microdata 36.

Further, the microaddress 6 input to the microaddress comparator 31 is compared in the same way to the mask address B0 for processing according to the result 32 of the comparison, as in the prior art example in the case of microcommand 24 which branches, such that the next microaddress 9 of the next microaddress register 10 is selected as the next microaddress 6, and in the case of microcommand 24 which involved microsub-routines, such that the microaddress 6 of the microaddress stack resister 11 is selected as the next microaddress 6.

Further, once an extension microcommand is selected, the microoutput selection circuit 42 continues to extension microdata 36 until detection of the end of the extension microcommand 24 with the sequence field 26 (until the end of the extension microcommand).

An example of the method of calculation of the extension microaddress 34 used in this embodiment will now be described. It is assumed that the addresses (all represented by hexadecimal numbers) desired to be masked are "000" to "00F", the microaddresses 6 in the microaddress ROM 1 are "000" to "FFF", and the extension microaddresses in the extension microaddress ROM 33 are "1000" to "1FFF".

The detection of the mask address 30 is effected when it is found by the microaddress comparator 31 that the microaddress 6 is identical with "00X" (X being either one of hexadecimal numbers 0 to F, i.e., one of 16 numbers). It is possible to compare all the microaddresses 6 one by one, such as "001", "002", . . . . Considering the scale of processing and speed of comparison, it is practical to effect block-by-block address comparison as noted above.

The concept of the extension microaddress is the same as ordinary memory bank switching. In one mode of the invention, as claimed in claims 1 and 3, the most significant bit of the extension microaddress pointer 35 is set to "1" for all the microaddresses 6 obtained as a result of command decoding in the command decoder 12, and extension microaddresses "1000" to "1FFF" of the extension microaddress ROM 33 are accessed for the respective microaddresses 6 of "000" to "FFF" at all times. In another mode of the invention, according to claims 2 and 4, an off-set value of "1000" is added, and the extension microaddresses "1000" to "1FFF" of the extension microaddress ROM 33 are accessed for the respective microaddresses 6 of "000" to "FFF" at all times. In this case, the microaddresses 6 to be masked are "000" to "00F", and the extension microaddresses "1000" to "100F" are accessed.

Regarding the process sequence in the case an extension microcommand is accessed, the extension microcommand has the address field 25 and sequence field 26, and by adding an additional sequence to the extension microaddresses of the extension microcommand ROM 33 other than "100X" the extension microcommand accessing can be performed as in the prior art example, until the end of extension microcommand is indicated with the sequence field 26.

In the above system, "0000" to "1FFF" in single storage means are accessed with variation of the method of access depending on the most significant address bit, i.e., either the address is "0XXX" or "1XXX". In the Embodiments 1 and 3 the region capable of being accessed by the pointer can be fixed so long as the extension microcommand ROM 33 and microcommand ROM 1 are provided separately. Thus, with the same microaddress 6 the distinction between the microcommand and extension microcommand can be realized with the alteration of the pointer for accessing the storage means. In Embodiments 2 and 4, by varying the off-set value, a plurality of apparent regions can be obtained even with a single pointer (so long as the regions are accessible).

While the above description is concerned with the extension microaddress ROM 33, the data in which is fixed, it is possible to permit writing of data from an external storage means for address re-writing of every command if a control circuit for writing is provided. Further, while the extension microcommand ROM 33 or microaddress pointer 33 is provided as a unit, it is also possible to provide a plurality of such units.

With the microprogram control circuit according to the invention as claimed in claim 1, it is possible to permit the detection of a microaddress by the microaddress comparator and permit the microaddress pointer selection circuit to receive the detection signal for selecting the extension microaddress pointer for switching the function of the command to be masked over to the function of the extension microcommand.

With the microprogram control circuit according to the invention as claimed in claim 2, it is possible to permit the detection of a microaddress by the microcommand comparator and permit the microaddress pointer selection circuit to receive the detection signal, and cause the microaddress operational unit to calculate an extension microaddress from the microaddress and offset address. This configures the extension microaddress pointer for switching the function of a command desired to be masked over to the function of the extension microcommand.

With the microprogram control circuit according to the invention as claimed in claim 3, it is possible to permit the detection of a microaddress by the microaddress comparator and permit the microoutput selection circuit receiving the detection signal, for selecting the output of the extension microcommand storage means for switching the function of a command to be masked over to the function of the extension microcommand.

With the microprogram control circuit according to the invention as claimed in claim 4, it is possible to permit a microaddress together with off-set address in the microaddress operational unit to derive an extension microaddress for detection by the microaddress comparator circuit and permit the microoutput selection means receiving the detection signal to select the output of the extension microcommand memory for switching the function of a command desired to be masked over to the function of the extension microcommand.

As has been described in the foregoing, according to the invention it is possible to realize extension or alteration of functions according to microcommands without revision or modification of the command decoder section. Thus, extension and addition of command functions are readily possible, thus permitting reduction of the cost and time of development of a product incorporating novel functions made available by the invention.

What is claimed is:

1. A microprogram control circuit for a microprocessor operable under the control of microcommands, comprising:

an instruction decoder, coupled to receive an instruction, for generating an entry microaddress when said instruction is decoded and providing said entry microaddress at an output node, said entry microaddress determined by an op code in said instruction;

a memory unit, having a first address input and a microdata word output, for storing a microcommand;

a microaddress pointer, having an input coupled to said output node, an output coupled to said first address input and a first select signal input, for asserting said entry microaddress to said first address input when said first select signal is asserted;

an extension memory unit, having a second address input and an extended microdata word output, for storing an extension microcommand;

a register for storing an off-set address and providing said off-set address at a first output;

a microaddress operational unit, having a first input coupled to said first output, a second input coupled to said output node and an extension entry microaddress output, for executing an operation on said off-set address and said entry microaddress to derive an extension entry microaddress;

an extension microaddress pointer, having an input coupled to said extension entry microaddress output, an output coupled to said second address input and a second select signal input, for asserting said entry microaddress to said second address input when said second select signal is asserted;

a register for storing a mask address and providing said mask address at a second output;

a comparator, having a first input coupled to said second output, a second input coupled to said output node and providing a match signal, for comparing said mask address with said entry microaddress, said match signal being asserted when said entry microaddress matches said mask address; and a microaddress pointer selector, having an input coupled to said match signal, a first select output coupled to said first select signal input and a second select output coupled to said second select signal input, for asserting said first select signal when said match signal is asserted and for asserting said second select signal when said match signal is deasserted.

2. The apparatus of claim 1 wherein said memory unit further comprises a pass-through input and said extended microdata word output is coupled to said pass-through input.

3. A microprogram control circuit for a microprocessor operable under the control of microcommands, comprising:

an instruction decoder, coupled to receive an instruction, for generating an entry microaddress when said instruction is decoded and providing said entry microaddress at an output node, said entry microaddress determined by an op code in said instruction;

a memory unit, having a first address input and a microdata word output, for storing a microcommand;

an extension memory unit, having a second address input and an extended microdata word output, for storing an extension microcommand;

a register for storing a mask address and providing said mask address at a second output;

a comparator, having a first input coupled to said second output, a second input coupled to said output node and providing a match signal, for comparing said mask address with said entry microaddress, said match signal being asserted when said entry microaddress matches said mask address; and a register for storing an off-set address and providing said off-set address at a first output;

a microaddress operational unit, having a first input coupled to said first output, a second input coupled to said output node and an extension entry microaddress output, for executing an operation on said off-set address and said entry microaddress to derive an extension entry microaddress; and a demultiplexer, having a first input coupled to said match signal, a second input coupled to said extension entry microaddress output, a first output coupled to said first address input and a second output coupled to said second address input, for asserting said entry microaddress to said first address input when said match signal is asserted and to said second address input when said match signal is deasserted.

4. The apparatus of claim 3 wherein said memory unit further comprises a pass-through input and said extended microdata word output is coupled to said pass-through input.

5. A microprogram control circuit for a microprocessor operable under the control of microcommands, comprising:

an instruction decoder, coupled to receive an instruction, for generating an entry microaddress when said instruction is decoded and providing said entry microaddress at an output node, said entry microaddress determined by an op-code in said instruction;

a memory unit, having a first address input, a pass-through input and a microdata word output, for storing a microcommand;

a microaddress pointer, having an input coupled to said output node, an output coupled to said first address input and a first select signal input, for asserting said entry microaddress to said first address input when said first select signal is asserted;

an extension memory unit, having a second address input and an extended microdata word output coupled to said pass-through input, for storing an extension microcommands;

an extension microaddress pointer, having an input coupled to said output node, an output coupled to said second address input and a second select signal input, for asserting said entry microaddress to said second address input when said second select signal is asserted;

a register for storing a mask address and providing said mask address at an output;

a comparator, having a first input coupled to said output, a second input coupled to said output node and providing a match signal, for comparing said mask address with said entry microaddress, said match signal being asserted when said entry microaddress matches said mask address; and a microaddress pointer selector, having an input coupled to said match signal, a first select output coupled to said first select signal input and a second select output coupled to said second select signal input, for asserting said first select signal when said match signal is asserted and for asserting said second select signal when said match signal is deasserted.

6. A microprogram control circuit for a microprocessor operable under the control of microcommands, comprising:

an instruction decoder, coupled to receive an instruction, for generating an entry microaddress when said instruction is decoded and providing said entry microaddress at an output node, said entry microaddress determined by an op code in said instruction;

a memory unit, having a first address input, a pass-through input and a microdata word output, for storing a microcommand;

a microaddress pointer, having an input coupled to said output node and an output coupled to said first address input, for asserting said entry microaddress to said first address input when said first select signal is asserted;

an extension memory unit, having a second address input and an extended microdata word output coupled to said pass-through input, for storing an extension microcommands;

an extension microaddress pointer, having an input coupled to said output node and an output coupled to said second address input, for asserting said entry microaddress to said second address input when said second select signal is asserted;

a register for storing a mask address and providing said mask address at an output;

a comparator, having a first input coupled to said output, a second input coupled to said output node and providing a match signal, for comparing said mask address with said entry microaddress, said match signal being asserted when said entry microaddress matches said mask address; and a selector, having an input coupled to said match signal output, a first input coupled to said microdata word output and a second input coupled to said extension microdata word, for selecting a microdata output, wherein said microdata word is selected when said match signal is asserted and said extension microdata word is selected when said match signal is deasserted.

7. A microprogram control circuit for a microprocessor operable under the control of microcommands, comprising:

an instruction decoder, coupled to receive an instruction, for generating an entry microaddress when said instruction is decoded and providing said entry microaddress at an output node, said entry microaddress determined by an op code in said instruction;

a memory unit, having a first address input, a pass-through input and a microdata word output, for storing a microcommand;

a microaddress pointer, having an input coupled to said output node and an output coupled to said first address input, for asserting said entry microaddress to said first address input when said first select signal is asserted;

an extension memory unit, having a second address input and an extended microdata word output coupled to said pass-through input, for storing an extension microcommand;

a register for storing an off-set address and providing said off-set address at a first output;

a microaddress operational unit, having a first input coupled to said first output, a second input coupled to said output node, and an extension entry microaddress output, for executing an operation on said off-set address and said entry microaddress to derive an extension entry microaddress;

an extension microaddress pointer, having an input coupled to said extension entry microaddress output and an output coupled to said second address input, for asserting said entry microaddress to said second address input when said second select signal is asserted;

a register for storing a mask address and providing said mask address at an output;

a comparator, having a first input coupled to said output, a second input coupled to said output node and providing a match signal, for comparing said mask address with said entry microaddress, said match signal being asserted when said entry microaddress matches said mask address; and a selector, having an input coupled to said match signal output, a first input coupled to said microdata word output and a second input coupled to said extension microdata word, for selecting a microdata output, wherein said microdata word is selected when said match signal is asserted and said extension microdata word is selected when said match signal is deasserted.

8. A microprogram control circuit for a microprocessor operable under the control of microcommands, comprising:

an instruction decoder, coupled to receive an instruction, for generating an entry microaddress when said instruction is decoded and providing said entry microaddress at an output node, said entry microaddress determined by an op code in said instruction;

a memory unit, having a first address input, a pass-through input and a microdata word output, for storing a microcommand;

an extension memory unit, having a second address input and an extended microdata word output coupled to said pass-through input, for storing an extension microcommand;

a register for storing a mask address and providing said mask address at an output;

a comparator, having a first input coupled to said output, a second input coupled to said output node and providing a match signal, for comparing said mask address with said entry microaddress, said match signal being asserted when said entry microaddress matches said mask address; and a demultiplexer, having a first input coupled to said match signal, a second input coupled to said output node, a first output coupled to said first address input and a second output coupled to said second address input, for asserting said entry microaddress to said first address input when said match signal is asserted and to said second address input when said match signal is deasserted.

9. A microprogram control circuit for a microprocessor operable under the control of microcommands, comprising:

an instruction decoder, coupled to receive an instruction, for generating an entry microaddress when said instruction is decoded and providing said entry microaddress at an output node;

a comparison circuit, having an input coupled to said output node and providing a match signal, for comparing a mask address with said entry microaddress, said match signal being asserted when said entry microaddress matches said mask address;

a memory unit, having a first address input and responsive to said match signal, for storing a microcommand, responsive to said entry microaddress at said first address input when said match signal is deasserted; and an extension memory unit, having a second address input and responsive to said match signal, for storing an extension microcommands, responsive to said entry microaddress at said second address input when said match signal is asserted.

10. A microprogram control circuit for a microprocessor operable under the control of microcommands, comprising:

an instruction decoder, coupled to receive an instruction, for generating an entry microaddress when said instruction is decoded and providing said entry microaddress at an output node;

a comparison circuit, having an input coupled to said output node and providing a match signal, for comparing a mask address with said entry microaddress, said match signal being asserted when said entry microaddress matches said mask address;

a memory unit, having a first address input and responsive to said match signal, for storing a microcommand, responsive to said entry microaddress at said first address input and providing a microdata word output when said match signal is deasserted; and an extension memory unit, having a second address input and responsive to said match signal, for storing an extension microcommands, responsive to said entry microaddress at said second address input and providing a microdata word output when said match signal is asserted.

11. A microprogram control circuit for a microprocessor operable under the control of microcommands, comprising:

an instruction decoder, coupled to receive an instruction, for generating an entry microaddress when said instruction is decoded and providing said entry microaddress at an output node;

a comparison circuit, having an input coupled to said output node and providing a match signal, for comparing a mask address with said entry microaddress, said match signal being asserted when said entry microaddress matches said mask address;

a memory unit, having a first address input and responsive to said match signal, for storing a microcommand, responsive to said entry microaddress at said first address input when said match signal is deasserted;

an off-set generation circuit, having an input coupled to said output node and an extension entry microaddress output, for calculating an extension entry microaddress, said extension entry microaddress being calculated by performing an operation on an off-set address and said entry microaddress; and an extension memory unit, having a second address input and responsive to said match signal, for storing an extension microcommands, responsive to said extension entry microaddress at said second address input when said match signal is asserted.

12. A microprogram control circuit for a microprocessor operable under the control of microcommands, comprising:

an instruction decoder, coupled to receive an instruction, for generating an entry microaddress when said instruction is decoded and providing said entry microaddress at an output node;

a comparison circuit, having an input coupled to said output node and providing a match signal, for comparing a mask address with said entry microaddress, said match signal being asserted when said entry microaddress matches said mask address;

a memory unit, having a first address input and responsive to said match signal, for storing a microcommand, responsive to said entry microaddress at said first address input and providing a microdata word output when said match signal is deasserted;

an off-set generation circuit, having an input coupled to said output node and an extension entry microaddress output, for calculating an extension entry microaddress, said extension entry microaddress being calculated by performing an operation on an off-set address and said entry microaddress; and an extension memory unit, having a second address input and responsive to said match signal, for storing an extension microcommands, responsive to said extension entry microaddress at said second address input and providing a microdata word output when said match signal is asserted.

* * * * *